US010879983B2

(12) United States Patent
Ma et al.

(10) Patent No.: US 10,879,983 B2
(45) Date of Patent: *Dec. 29, 2020

(54) METHODS AND APPARATUS FOR MULTI-FREQUENCY BEAMFORMING

(71) Applicants: Massachusetts Institute of Technology, Cambridge, MA (US); The Brigham and Women's Hospital, Inc., Boston, MA (US)

(72) Inventors: Yunfei Ma, Santa Clara, CA (US); Zhihong Luo, Berkeley, CA (US); Christoph Steiger, Berlin (DE); Carlo Giovanni Traverso, Newton, MA (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,068

(22) Filed: May 17, 2020

(65) Prior Publication Data
US 2020/0280356 A1    Sep. 3, 2020

Related U.S. Application Data

(63) Continuation of application No. 16/391,740, filed on Apr. 23, 2019, now Pat. No. 10,693,544.
(Continued)

(51) Int. Cl.
*H04B 7/02* (2018.01)
*H04B 7/06* (2006.01)
(Continued)

(52) U.S. Cl.
CPC ....... *H04B 7/0617* (2013.01); *G06K 7/10217* (2013.01); *H04B 13/005* (2013.01)

(58) Field of Classification Search
CPC . H04B 7/0617; H04B 13/005; G06K 7/10217
See application file for complete search history.

(56) References Cited

U.S. PATENT DOCUMENTS 8,995,587 B1 * 3/2015 Zhang ................. H04B 7/0417
375/343
10,291,066 B1 * 5/2019 Leabman ................ H02J 7/025
(Continued)

*Primary Examiner* — Dhaval V Patel
(74) *Attorney, Agent, or Firm* — Stephen R. Otis

(57) ABSTRACT

Multiple antennas of a beamformer may simultaneously transmit wireless signals at different frequencies. The signals may comprise synchronized, identical wireless commands, each at a different carrier frequency. The transmitted signals may constructively and destructively interfere with each other at a receiver antenna, to form a beat signal. When the transmitted signals constructively interfere, the beat signal may cause a voltage in the receiver to exceed a threshold voltage. The threshold voltage may be a minimum voltage at which a device, which is operatively connected to the receiver antenna, is able to perform energy harvesting or wireless communication. The beamformer may operate under blind channel conditions, because the transmitted frequencies may be selected in such a way as to maximize peak power delivered under all possible channel conditions. The beamformer may deliver wireless power to a sensor or actuator that is located deep inside bodily tissue.

23 Claims, 5 Drawing Sheets

Related U.S. Application Data

(60) Provisional application No. 62/661,603, filed on Apr. 23, 2018.

(51) Int. Cl.
*G06K 7/10* (2006.01)
*H04B 13/00* (2006.01)

(56) References Cited

U.S. PATENT DOCUMENTS

2009/0184802 A1* 7/2009 Park ............... G06K 17/0029
340/10.1
2017/0116443 A1* 4/2017 Bolic ............... H02J 50/90

* cited by examiner

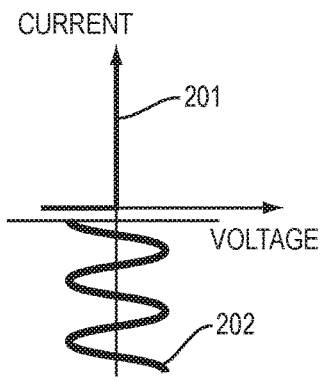
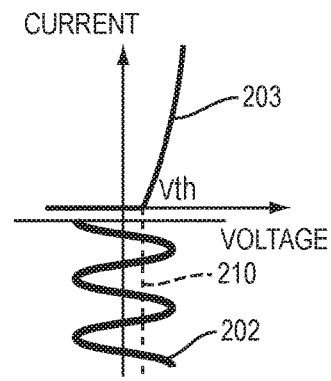
FIG. 2A  FIG. 2B
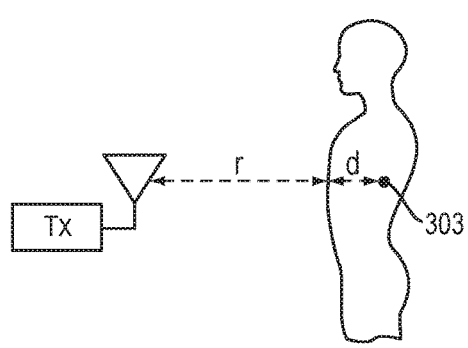
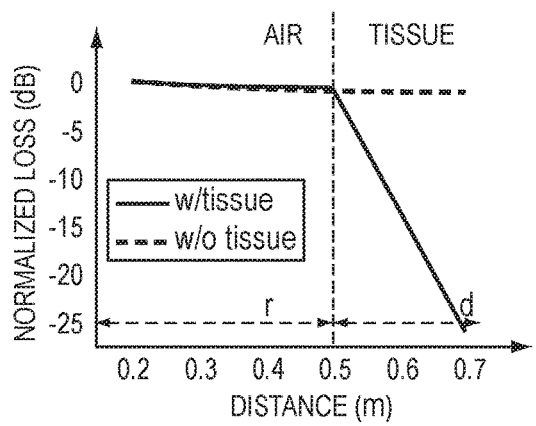
FIG. 3A  FIG. 3B
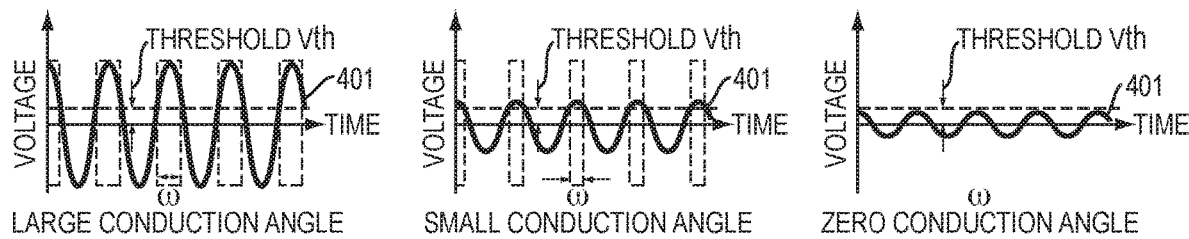
FIG. 4A  FIG. 4B  FIG. 4C

METHODS AND APPARATUS FOR MULTI-FREQUENCY BEAMFORMING

RELATED APPLICATIONS

This application is a continuation of U.S. application Ser. No. 16/391,740 filed on Apr. 23, 2019, which claims the benefit of U.S. Provisional Application No. 62/661,603 filed Apr. 23, 2018 (the "Provisional").

STATEMENT REGARDING FEDERALLY SPONSORED RESEARCH OR DEVELOPMENT

This invention was made with government support under Grant No. CNS-1739723 awarded by the National Science Foundation and under Grant No. NIH EB000244 awarded by the National Institutes of Health. The government has certain rights in the invention.

FIELD OF TECHNOLOGY

The present invention relates generally to beamforming.

SUMMARY

In illustrative implementations of this invention, a multi-antenna beamformer simultaneously transmits RF signals at different frequencies. For instance, each antenna in the beamformer may transmit at a different carrier frequency, while all the antennas of the beamformer simultaneously transmit the same wireless command (e.g., by performing synchronized, identical modulations of their respective carrier waves).

The frequency at which an antenna in the beamformer transmits, at a given time, may be different than that at which each other antenna in the beamformer is then transmitting. Furthermore, each RF signal that is transmitted by an antenna in the beamformer may be generated by a different oscillator (such as a PLL) and thus may have a different initial phase offset.

The transmitted signals may constructively and destructively interfere at a receiver antenna that is external to the beamformer. The RF signal that results from this constructive and destructive interference at the receiver antenna (the "beat signal") may be a superposition of the transmitted signals at the receiver antenna. The amplitude of the beat signal may be time-varying.

The transmitted signals may, during short portions of the beat signal. constructively interfere in such a way as to cause a voltage in the receiver (input voltage $V_{in}$) to be much larger than during other portions of beat signal. For instance, the transmitted signals may, during short portions of the beat signal, constructively interfere in such a way as to cause input voltage $V_{in}$ to exceed a threshold voltage. The threshold voltage may be a minimum voltage at which a device, which is operatively connected to the receiver antenna, is able to perform a certain function (e.g., a function such as energy harvesting or wireless communication).

We sometimes refer to the multi-frequency beamforming which is performed in illustrative implementations of this invention as "CI beamforming". We sometimes refer to a physical beamformer that performs this multi-frequency beamforming as a "CI beamformer".

An advantage of CI beamforming is that it enables RF energy harvesting to occur at distances or in media where RF energy harvesting would otherwise be unfeasible due to signal attenuation and blind channel conditions. This in turn may enable power delivery to, and communication with, a device that houses an RF energy harvester, when such delivery or communication would otherwise be unfeasible due to signal attenuation and blind channel conditions.

In some implementations, CI beamforming greatly extends the distance over which RF signals may be successfully transmitted through air, under blind channel conditions, to enable RF energy harvesting. For example, in a test of a prototype of this invention, CI beamforming increased, by a factor of more than seven times (as compared to conventional beamforming), the distance at which a passive, battery-free RFID tag that is located in air may be powered up by an RF wireless signal. In this test, a prototype of the CI beamformer powered up a passive, battery-free RFID tag that was located in air at a distance of 38 meters from the CI beamformer. This test was performed under blind channel conditions.

In some implementations, CI beamforming enables delivery of RF wireless power to, and communication with, a battery-free sensor that is implanted deep in bodily tissue. For instance, in tests of a prototype of this invention, CI beamforming enabled successful energy harvesting by a passive, battery-free RFID tag that was located in a stomach of a pig. Again, these tests were performed under blind channel conditions.

In contrast, conventional beamforming is not able to deliver wireless RF power through tissue in such a way as to enable RF energy harvesting deep inside the tissue. This is due to at least three factors: First, the power of an RF signal decays exponentially as depth of the energy harvester in tissue increases (and thus as the distance that the RF signal travels through tissue increases). Second, it is highly desirable for the antenna of an implantable energy harvester to be very small. However, reducing the size (and thus effective area) of the antenna reduces the ability of the antenna to harvest RF energy. Third, beamforming through tissue occurs in blind channel conditions. The blind channel conditions may arise because the amount of attenuation of the RF signal in the tissue is unknown (e.g., due to the fact that the tissue is an inhomogeneous media with varying and unknown attenuation coefficients, or due to the fact that exact location of the energy harvester in the tissue is unknown). Likewise, the blind channel conditions may arise due to the fact that dielectric constants of the tissue may vary depending on the type of tissue and may vary over time, making it impracticable to model the RF channels. Conventional beamforming requires prior knowledge of the RF channel. For instance, in conventional beamforming, this prior knowledge may be obtained by receiving a signal from an external sensor. However, this prior knowledge of the RF channel may be missing when an implanted, passive, battery-free sensor is in "off" mode waiting to receive a signal before it powers up.

In many scenarios, an energy harvester is able to harvest energy only if a voltage $V_{in}$ across a diode in the energy harvester exceeds the diode's threshold voltage $V_{th}$. In some cases, this is because: (a) in order for the energy harvester to harvest energy, electric current must flow through a diode and build up charge in a capacitor; and (b) current flows through the diode (i.e., the diode is on) only when $V_{in}$ exceeds $V_{th}$.

In some implementations, the multiple different frequencies that are simultaneously transmitted by the CI beamformer are selected in such a way as to maximize the peak power of the beat signal over all possible channel conditions. Solving the optimization algorithm may involve finding, or may be equivalent to finding, the optimal set of frequency differences between transmitted frequencies, in order to maximize the peak power of the beat signal. The optimization algorithm may be performed subject to one or more constraints. For instance, the optimization algorithm may ensure amplitude flatness—i.e., may ensure that amplitude of the beat signal falls within a specified range (e.g., varies by no more than a specified percent). This amplitude flatness may be desirable when attempting to power up and communicate with a backscatter node, where the backscatter is able to correctly decode a received signal only when amplitude of the received signal falls within the specified range.

Optimizing in this manner—to maximize the peak power of the beat signal over all possible channel conditions—is advantageous because it enables CI beamforming to operate in blind channel conditions. Thus, CI beamforming is well-suited for delivering wireless power, under unknown channel conditions, to battery-free sensors that are implanted deep in tissue.

In some cases, a single Monte Carlo simulation is performed, to solve this optimization.

In some implementations, a CI beamformer adaptively hops the frequency band in which it transmits the multiple frequencies. For instance, the CI beamformer may hop the frequency band if all or some of the transmitted frequencies are being attenuated too much by multipath fading. In some implementations, after each frequency hop (or at least after each of a subset of the frequency hops), the optimization algorithm (to maximize peak power) is performed.

In some implementations, an out-of-band reader is employed to mitigate or avoid self-jamming (also know as self-interference) that might otherwise occur. This self-jamming might occur as follows: If RF signals were transmitted by the CI beamformer's multi-antenna transmitter at a first set of frequencies, and their reflections from a backscatter node were measured by the system's receiver at the same set of frequencies, the transmitted signals might saturate the system's receiver, preventing the receiver from accurately detecting the reflections from the backscatter node. To mitigate or avoid this self-jamming, the out-of-band reader may exploit the fact that, in many scenarios, a backscattering node is frequency-agnostic over a range of frequencies and modulates reflections of RF signals at all RF frequencies within that range.

Specifically, the out-of-band reader may transmit an RF signal at a frequency (reader frequency) that is different than each frequency at which the CI beamformer is transmitting. The out-of-band reader may detect reflections from the backscatter node at the reader frequency. The CI beamformer may transmit at a first set of frequencies to power up the backscatter node, but self-jamming may be avoided, because of the reader frequency is different than each of the first set of frequencies.

In illustrative implementations, CI beamforming has many practical applications. For instance, as discussed above, CI beamforming may be employed to transmit RF signals through air, to enable an energy harvester located in air to harvest energy at a distance from the beamformer that is greater than what would otherwise be possible. Also, CI beamforming may deliver wireless RF power to sensors or actuators that are ingested or that are implanted deep inside human tissue or other mammalian tissue. The sensors may measure any physiological parameter. Among other things, the sensors may detect an optogenetic response to light stimulation. In some cases, the actuators deliver drugs.

In some implementations, CI beamforming is performed to deliver wireless power to, or communicate with, a device that is immersed in liquid. For instance, in tests of a prototype of this invention, MF beamforming enabled successful energy harvesting by a passive, battery-free RFID tag that was immersed in water at a depth of more than 10 cm below the water's surface.

In some use scenarios of this invention, channel feedback is not available from battery-free sensors (because the beamforming needs to power the sensors up in the first place).

In some implementations, CI beamforming focuses its energy at in-vivo sensors without prior channel knowledge. Instead of phase-encoding the transmitted signals from multiple antennas as in traditional beamforming, CI beamforming may frequency-encode its signals. This frequency encoding may enable CI beamforming to focus energy on any point in 3D space, even in inhomogeneous media (e.g., multiple layers of tissues) and despite dense multipath due to reflections off different organs.

In some implementations, CI beamforming is part of a system that optimally delivers power to and communicates with deep-tissue biosensors and bioactuators. In CI beamforming, frequency combinations may be selected in such a way as to maximize power transfer to any point in 3D space. The optimization function may incorporate communication constraints of battery-free sensors including modulation depth, power stability, and adaptive duty cycling.

The use of an out-of-band reader is not limited to CI beamforming. An out-of-band reader may be employed in any system that delivers wireless power to, or communicates with, a backscatter node (e.g., a passive, battery-free RFID tag). The system may deliver wireless power to the backscatter node at a first frequency, to power up the backscatter node or to communicate with the backscatter node. The out-of-band reader may transmit wireless signals to the backscatter node at a second frequency. The out-of-band reader may also measure modulated reflections from the backscatter node at the second frequency. The first and second frequencies may be different, and thus self-jamming that might otherwise occur may be avoided.

This invention is not limited to radio signals. More generally, a CI beamformer may beamform any type of wireless signal, including any sound signal, ultrasound signal, longitudinal pressure wave signal, visible light signal, infrared light signal or ultraviolet light signal. For instance, in some cases, the CI beamsformer includes, instead of antennas, other signal sources. For instance, the other signal sources may comprise: (a) speakers or other transducers that generate sound, ultrasound or other pressure waves; or (b) light sources that emit visible, infrared or ultraviolet light.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 2A is a chart that plots current versus voltage for an ideal diode.
FIG. 2B is a chart that plots current versus voltage for a real-world diode.

FIG. 3A illustrates propagation of an RF signal through air and then through bodily tissue.

FIG. 3B is a chart that illustrates RF signal power loss in air and in bodily tissue.

FIGS. 4A, 4B and 4C illustrate the impact of the diode threshold effect on RF power harvesting.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Technical Challenges in Deep Tissue Networking

In this section, we explain technical challenges in delivering RF energy to power up and communicate with miniature medical devices through deep tissues. First, we describe basic principles of RF power harvesting. Second, we describe what we call the "threshold effect" in RF power harvesting. Third, we discuss why overcoming this threshold effect is challenging for deep-tissue micro-implants.

Basic Principles of RF Power Harvesting: To harvest energy, a battery-free sensor may convert RF signals in the environment into a DC (Direct Current) voltage. The component which allows the sensor to achieve this RF-to-DC conversion is called an energy harvester (or rectifier).

Figure 1A:
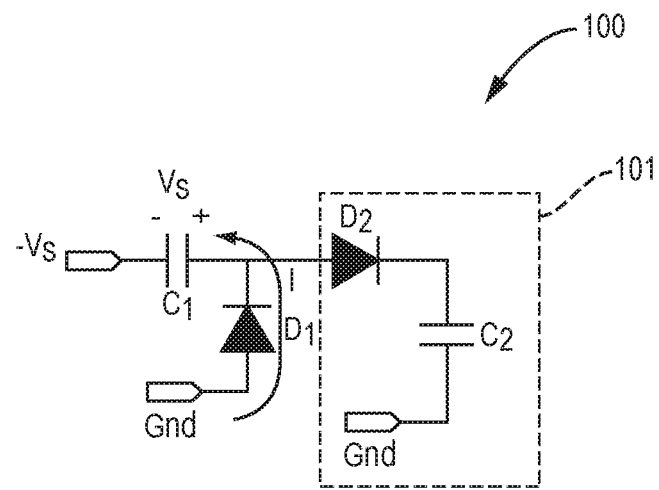
FIGS. 1A and 1B show an RF power harvesting circuit.
Figure 1B:
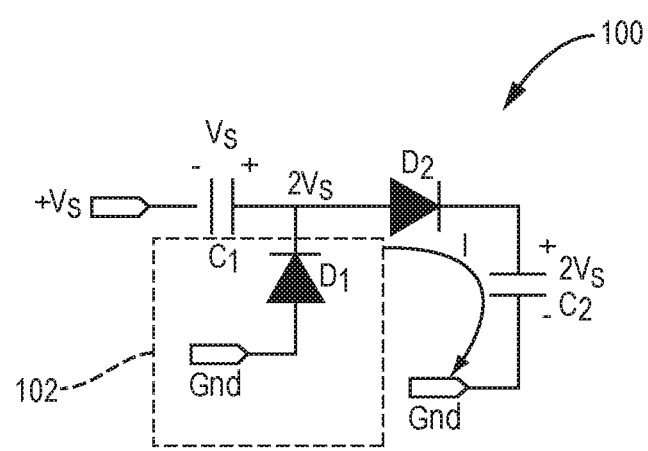

A simplified schematic of an ideal RF energy harvester is shown in FIGS. 1A and 1B. The energy harvester utilizes a diode's rectifying effect to convert energy from RF to DC voltage. In its simplest form, the harvester comprises two capacitors ($C_1$ and $C_2$) and two diodes ($D_1$ and $D_2$). The diodes allow current to flow only in one direction (denoted by the triangle). In particular, when the voltage across an ideal diode is positive, it allows current to flow, but when the voltage across an ideal diode is negative, it blocks the current.

To understand how an ideal energy harvester works, consider what happens when the RF signal alternates between its negative and positive half-cycles:

FIG. 1A shows operation of an ideal RF energy harvester 100 during the negative half-cycle of the RF signal—that is, when $V_{in}$ (voltage at the receiver antenna of the harvester) is negative. In the negative half-cycle (i.e., $V_{in}<0$), diode $D_1$ is on while diode $D_2$ is off. Hence, the current flows from the ground through $D_1$ and builds up charge in $C_1$. In the steady state, the voltage across $C_1$ is $V_s$, which denotes the amplitude of $V_{in}$. During the negative half-cycle of the RF signal, no current flows in the portion of the ideal energy harvester that is inside region 101.

FIG. 1B shows operation of this same ideal RF energy harvester 100 during the positive half-cycle of the RF signal—that is, when $V_{in}$ (voltage at the receiver antenna of the harvester) is positive. In the positive half-cycle (i.e., $V_{in}>0$), diode $D_1$ is off while diode $D_2$ is on. Hence, the current flows through $D_2$ and charges $C_2$. In the steady state, the voltage across $C_2$ is $2V_s$, since it is the summation of the peak of $V_{in}$ and the built up voltage across $C_1$ during the negative half-cycle. During the positive half-cycle of the RF signal, no current flows in the portion of the ideal energy harvester that is inside region 102.

The above description of an energy harvester is simplified in two aspects:

First, FIGS. 1A and 1B show a single-stage power harvester. Today's power harvesters are often constructed in multi-stage structure, with each stage multiplying the voltage of the previous one. Hence, the voltage at the output of an N-stage harvester may be $NV_s$.

Second, the above description assumes an ideal power harvester where all the input voltage is harvested. In practice, however, the performance of the energy harvester declines dramatically as the input voltage $V_s$ decreases. This is due to the diode threshold effect, which we explain next.

Threshold Effect: In our discussion of FIGS. 1A and 1B, we assumed an ideal diode—that is, a diode that is on whenever the voltage across it is positive, and that is off whenever the voltage across it is negative. FIG. 2A shows this ideal behavior by plotting current versus voltage across an ideal diode. In FIG. 2A, dark line 201 represents current as a function of voltage. In FIG. 2A, current flows through an ideal diode whenever voltage across the diode is positive.

Practical diodes, however, do not exhibit this ideal behavior. In particular, in order to conduct a current through a diode, one must overcome an energy barrier, which is reflected in the threshold voltage. Said differently, the input voltage has to be larger than a threshold voltage $V_{th}$ to turn on a diode. Whenever the voltage drops below the threshold, the diode switches off. As a result, the voltage that accumulates in the negative cycle is equal to $V_s-V_{th}$, and the voltage that can be eventually achieved across $C_2$ is $2(V_s-V_{th})$. FIG. 2B illustrates this behavior by plotting current versus voltage across a realistic diode. In FIG. 2B, dark line 203 represents current as a function of voltage. In FIG. 2B, current flows through a real-world diode whenever voltage across the diode exceeds a threshold voltage $V_{th}$ 210.

In FIGS. 2A and 2B, curved dark line 202 conceptually represents a time-varying input voltage (however, for line 202, unlike the rest of FIGS. 2A and 2B, the vertical axis is time).

When extending to an N-stage energy harvester, the maximum output voltage $V_{DC}$ can be written as:

$$V_{DC}=N(V_s-V_{th}) \qquad \text{(Equation 1)}$$

As can be seen from Equation 1, due to the voltage barrier $V_{th}$, the energy harvester is significantly more efficient with a large input voltage than with a small input voltage. In fact if $V_s<V_{th}$, the energy harvester cannot harvest any energy. For standard integrated circuits (IC) process, the threshold voltage is usually between 200 mV and 400 mV.

This threshold voltage places a limit on the operation of RF power harvesters. For example, without beamforming, a conventional passive RFID tag can only be powered up if it is within 5-10 m from the RFID reader. Beyond this range, without beamforming, the received power at a conventional passive RFID tag cannot harvest enough energy to overcome the diode threshold voltage.

Challenges in Overcoming Threshold Voltage: For at least two reasons, it is difficult to deliver a sufficiently powerful RF signal to a deep tissue implant to overcome the threshold voltage. The first reason is the attenuation of RF signals as they propagate in biotissues, and the second reason is their miniature form factor.

Attenuation: First, we discuss the attenuation problem. RF signals traveling from air into biotissues experience two sources of attenuation. One source of attenuation arises from the reflection of RF signals at the air-tissue boundary. Due to this reflection, only a fraction of the incident signal traverses the boundary. For RF signals in the 1 GHz range, this results in a loss of around 3-5 dB. A second and more significant source of attenuation arises from the exponential loss due to propagation through the tissue. For example, RF signals in the low-GHz range experience a loss ranging from 2.3 to 6.9 dB/cm when propagating through tissue that has a dielectric constant of 50 and a conductivity of 1 to 3 S/m. This translates to a loss of 11.5 to 35.4 dB at a depth of 5 cm.

Mathematically, let us denote the distance between the body and transmit antenna by r and the depth inside the tissue by d (with d<<r), as shown in FIG. 3A. We can express the overall amplitude of the electric field E in the biotissue as:

$$|E| = \frac{TA}{r} e^{-\alpha d} \quad \text{(Equation 2)}$$

where A is the amplitude of the transmitted signal, T is the transmittance coefficient (i.e., the fraction that traverses the air-tissue boundary), and α is the attenuation constant of the RF signal in the tissue.

In many mammalian tissues, a is in a range between 13 $m^{-1}$ and 80 $m^{-1}$.

Note from Equation 2 that if the signal travels entirely in air, then the signal attenuation is only inversely proportional to the travel distance. However, once the signal starts propagating in tissues, the exponential term dominates. Also note that the above equation describes the electric field, while the received power is proportional the $E^2$, and hence degrades quadratically in r and exponentially in d.

In the example shown in FIG. 3A, a transmitter transmits a wireless RF signal that travels a distance r through air, and then travels a distance d through tissue and then reaches in-vivo sensor 303. Sensor 303 houses an RF energy harvester.

FIG. 3B is a chart that illustrates RF signal power loss in air and in bodily tissue. Specifically, FIG. 3B plots the normalized loss (in log scale) of RF signal power as a function of distance in air and in tissue.

Miniature Form Factor: A second challenge for harvesting energy in deep tissues arises from the miniature form factor of micro-implants. In particular, it is highly desirable to employ a miniature form factor for medical devices that are implanted or injected into the brain, blood stream, or in deep tissues. This, in turn, constrains the size of their antennas, often to millimeter-scale or sub-millimeter) dimensions.

Yet, the ability of an antenna to harvest RF power is directly related to its size. In particular, the receive power $P_L$ that may be harvested by the energy-harvesting circuit can be expressed as a function of the electric field E and the effective antenna area $A_{\mathit{eff}}$ as:

$$P_L = \frac{E^2}{\eta} A_{\mathit{eff}} \quad \text{(Equation 3)}$$

where η denotes the wave impedance, which is a function of the medium.

As per Equation 3, the amount of energy harvested is directly proportional to the effective area of the antenna. As an analogy, a passive RFID's range uniformly increases with its size (assuming proper matching). This places a stringent constraint on the power-harvesting efficiency of sensors with antenna dimensions smaller than 1 cm.

To summarize this section, in-vivo battery-free networking is challenging due to at least two factors. First, due to the threshold effect, the energy harvesting efficiency is highly sensitive to the signal amplitude. Second, the exponential tissue loss and miniature antenna form factor cause significant attenuation.

FIGS. 4A-4C illustrate the effect of moving a sensor (and a energy harvester that it houses) from air into deep tissue, when conventional beamforming is employed. With conventional beamforming, when the energy harvester is deep inside tissue, the received signal does not exceed the threshold voltage, and thus no energy harvesting occurs. For each of the examples shown in FIGS. 4A-4C, let us consider the sensor's conduction angle co, or equivalently, the time interval when the diode is on.

FIG. 4A illustrates a example where the sensor (and the RF energy harvester it houses) are in air and close to the RF power source. In FIG. 4A: (a) the signal is well above the threshold voltage during much of each cycle of the signal; (b) there is a large conduction angle; (c) a large portion of the input RF energy may be converted to DC voltage, and (d) the overall energy harvesting efficiency may be high.

FIG. 4B illustrates a example when the sensor (and the RF energy harvester it houses) are at a shallow depth in tissue. In FIG. 4B: (a), the input signal amplitude is attenuated but is at times above the threshold voltage; (b) the conduction angle is smaller than in FIG. 4A; (c) the percentage of the input signal power that can be effectively used is smaller, which in turn decreases the overall energy harvesting efficiency; but (d) the system may still operate (e.g., by duty cycling the sensor's operation so that it may accumulate sufficient energy before communication or actuation).

FIG. 4C illustrates a example where the sensor (with energy harvester it houses) are placed deep inside tissue. In FIG. 4C, even the peak value of the input voltage drops below the threshold voltage. In this example, the conduction angle becomes zero and no energy can be harvested.

Specifically, FIGS. 4A, 4B and 4C plot voltage $V_{in}$ 401 as a function of time. In FIG. 4A, the RF energy harvester is in air close to the transmitter. In FIG. 4B, the RF energy harvester is at a shallow depth in tissue. In FIG. 4C, the RF energy harvester is in deep tissue.

In FIGS. 4A and 4B, when voltage $V_{in}$ exceeds the threshold voltage $V_{th}$, the following state occurs in the RF energy harvester: (a) the energy harvester harvests energy, and (b) electrical current flows from ground through a diode (e.g., diode $D_1$ in FIG. 1A) to build up charge in a capacitor (e.g., capacitor $C_1$ in FIG. 1A). In FIGS. 4A and 4B, the dashed boxes indicate portions of the RF signal in which this state occurs.

In FIG. 4A (where the energy harvester is in air near the transmitter), voltage $V_{in}$ exceeds the threshold voltage $V_{th}$ for a large portion of each cycle of the RF signal. In FIG. 4B (where the energy harvester is at a shallow depth in tissue), voltage $V_{in}$ exceeds the threshold voltage $V_{th}$ for a smaller portion of each cycle of the RF signal. In FIG. 4C (where the energy harvester is deep in tissue), voltage $V_{in}$ does not exceed the threshold voltage $V_{th}$ at all.

As noted above, FIGS. 4A-4C illustrate the effect of threshold voltage when conventional beamforming is employed. We now discuss how the present invention overcomes these challenges, and powers RF energy harvesters even when they are located deep in tissue.

CI Beamforming

In illustrative implementations, CI beamforming enables wireless power delivery to, and communication with, deep-tissue miniature medical devices.

In some implementations, CI beamforming comprises simultaneously transmitting RF signals at multiple carrier frequencies from multiple transmit antennas, in such a way that constructive interference of the transmitted signals causes voltage in an energy harvester to exceed the threshold voltage of the energy harvester during some time intervals. During those time intervals, the energy harvester harvests RF energy.

In illustrative implementations, even when the sensor (and energy harvester that it houses) are located deep inside tissue, CI beamforming enables energy harvesting. CI beamforming may achieve this by generating sufficient constructive interference to cause the received signal at the energy harvester to exceed threshold voltage at certain times. This in turn allows the sensor to overcome the threshold voltage despite RF attenuation and despite the sensor's miniature size.

Advantageously, CI beamforming performs well under blind channel conditions (e.g., where the amount of attenuation of the RF signal is unknown, or the location or depth of the sensor/energy harvester are not known).

Figure 5A:
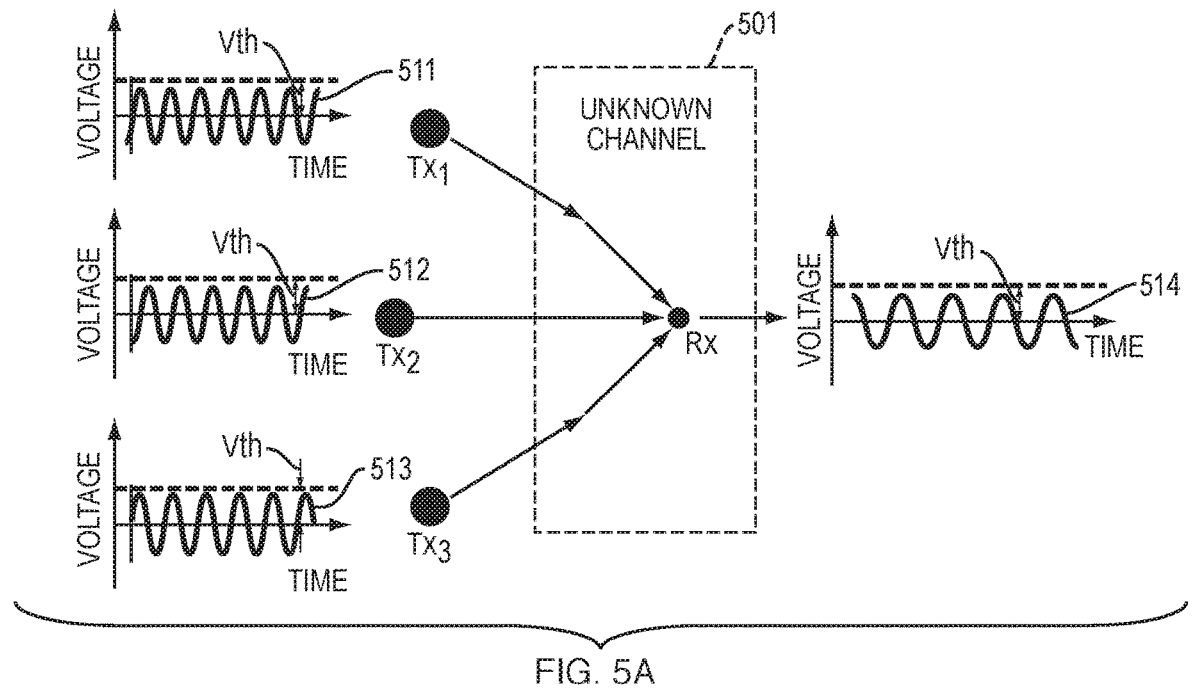
FIGS. 5A and 5B illustrate beamforming under unknown channel conditions.
Figure 5B:
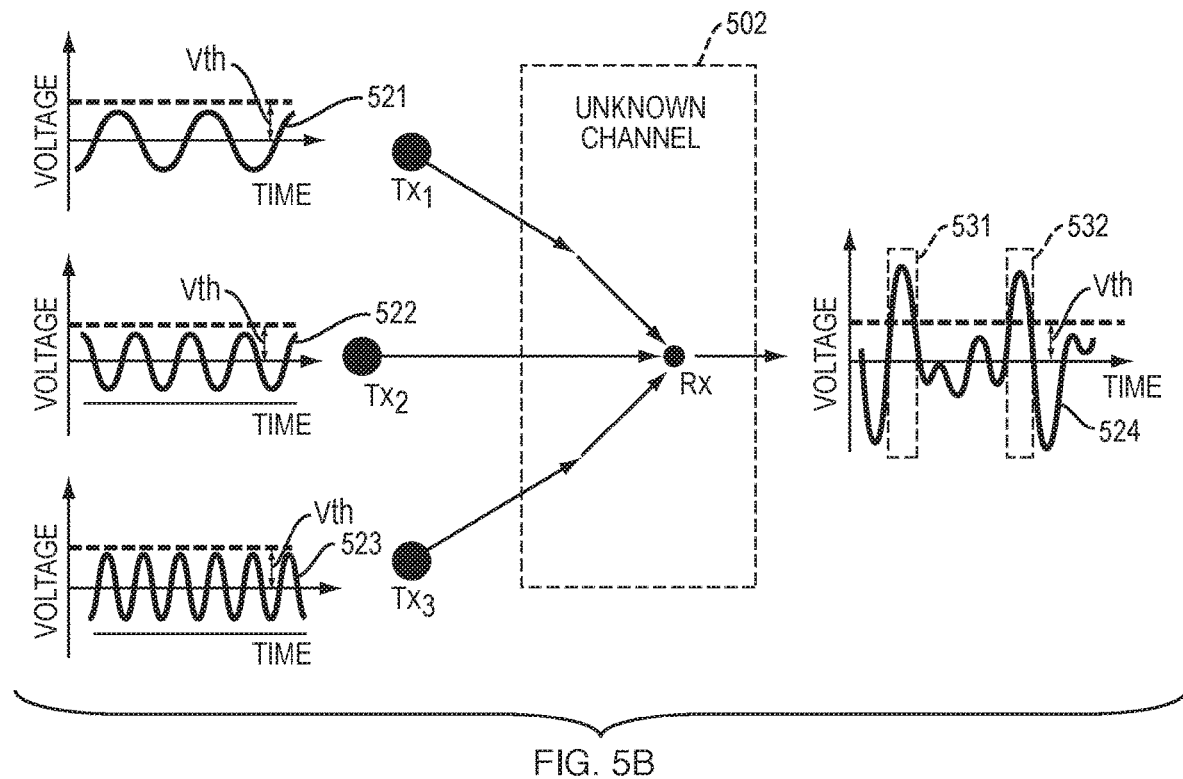

FIGS. 5A and 5B compare beamforming methods under blind channel conditions. In FIG. 5A, conventional beamforming is performed under blind channel conditions and is unable to provide power an RF energy harvester. In FIG. 5B, CI beamforming is performed (in an illustrative implementation of this invention) and successfully powers an RF energy harvester.

In FIGS. 5A and 5B, a receiver $R_x$ of an energy harvester is located inside a media (501 or 502). This media may be inhomogeneous, may have unknown attenuation coefficients, and may be denser than air. RF channels through the media (501 or 502) may be blind or unknown.

In FIG. 5A, conventional beamforming employs coherent frequencies which are unlikely to combine constructively without channel feedback. In FIG. 5A, three transmitters ($TX_1$, $TX_2$, $TX_3$) perform conventional beamforming by simultaneously transmitting three RF signals, each of the signals being at a different phase but each of the signals being at the same carrier frequency. Each of the three transmitted RF signals, respectively, would (if it did not constructively or destructively interfere with other waveforms) by itself produce a voltage waveform (511, 512, or 513) in receiver $R_x$ of the energy harvester, which voltage waveform does not at any time exceed the threshold voltage $V_{th}$ of the energy harvester. In FIG. 5A, a voltage waveform 514 results, in receiver $R_x$ of the energy harvester, from constructive and destructive interference of the three transmitted RF signals. This resulting voltage waveform 514 is unlikely to have a voltage that exceeds the threshold voltage $V_{th}$ of the energy harvester. Thus, in FIG. 5A, a conventional beamformer is unable to power an RF energy harvester in blind channel conditions.

FIG. 5B illustrates CI beamforming under blind channel conditions, in an illustrative implementation of this invention. In FIG. 5B, three transmitters ($TX_1$, $TX_2$, $TX_3$) simultaneously transmit three RF signals, each at a different carrier frequency. Again, each of the three transmitted RF signals, respectively, would (if it did not constructively or destructively interfere with other waveforms) by itself produce a voltage waveform (521, 522, or 523) in receiver $R_x$ of the energy harvester, which voltage waveform does not at any time exceed the threshold voltage $V_{th}$ of the energy harvester. Again, in FIG. 5B, a voltage waveform 524 results, in receiver $R_x$ of the energy harvester, from constructive and destructive interference of the three transmitted RF signals.

However, because the three transmitted signals in FIG. 5B are each at different carrier frequencies, the resulting waveform 524 has a voltage that exceeds the threshold voltage $V_{th}$ of the energy harvester during a portion of the waveform. The time periods during which waveform 524 has a voltage that exceeds the threshold voltage are indicated in FIG. 5B by dashed boxes 531 and 532. During these time periods (when waveform 524 has a voltage that exceeds $V_{th}$), the energy harvester harvests RF power.

In illustrative implementations of this invention, CI beamforming involves transmitting synchronized commands at multiple carrier frequencies. In illustrative implementations, these synchronized commands (each at a different carrier frequency) boost the peak power and overcome the threshold effect at the sensors' energy harvester without the need for channel information.

Beamforming may leverage multiple antennas to focus RF energy toward a receiver. The signals transmitted from the different antennas may traverse slightly different paths before arriving at the sensor. In conventional beamforming, the fact that each of the signals travels a different distance to the receiver causes each of the signals to experience a different RF channel. However, in CI beamforming, the different transmitted signals may be in different channels, not only because each signal travels a different distance to the receiver but also because each signal is at a different carrier frequency.

A beamformer may precode the transmitted signals so that they constructively interfere at the receiver, maximizing the received energy.

Mathematically, let $x_i$ denote a signal transmitted by antenna i, and let $h_i$ denote the channel experienced by signal $x_i$. We can express the signal received at the in-vivo sensor as:

$$y = \sum_i h_i x_i \qquad \text{(Equation 4)}$$

Hence, in order to maximize the received energy, it would helpful, if possible, to estimate the channels $h_i$ and set $x_i = h_i^*$.

Unfortunately, channel estimation is infeasible in the context of in-vivo battery-free networking for two reasons:

Tissue inhomogeneity: First, RF signals traveling from air to an in-vivo sensor traverse different media, including multiple layers of tissues (including skin, fat, muscles, etc.). These signals may also experience multipath as they reflect off different organs before arriving at the sensor. This makes it intractable to predict $h_i$.

Battery-Free Nature: In principle, one could overcome this challenge by directly estimating the channel between the transmitter and the receiver. However, channel estimation may require powering up the battery-free sensor in the first place, which is infeasible when the sensor is in deep-tissue.

Thus, in practical scenarios where beamforming is employed to power an in-vivo energy harvester, beamforming occurs under blind channel conditions.

As noted above, we sometimes loosely refer to beamforming performed in this invention as "CI beamforming". "CI" is acronym that stands for coherently-incoherent.

In some implementations, CI beamforming is coherent, in the sense that: (a) the commands transmitted from all the antennas are the same (e.g., are identical modulations of their respective carrier waves), and (b) all antennas transmit their commands at the exact same time (synchronously). This is desirable because battery-free sensors decode by detecting energy levels; hence it is helpful for the transmissions to be synchronized in order for the sensors to observe the same energy envelopes across the different transmit antennas.

In some implementations, CI beamforming is incoherent, in the sense that the frequencies transmitted from the antennas are different. The frequency discrepancies may emulate a time-varying channel. CI beamforming may exploit these time-varying characteristics to deliver wireless power even under blind channel conditions.

However, the preceding three paragraphs (and the coherently-incoherent transmission discussed therein) do not limit this invention in any way and do not limit CI beamforming in any way. This invention (and CI beamforming) may be performed in other ways.

Let us describe a mathematical model of beamforming, in an illustrative implementation of this invention. Consider a CI beamformer with N transmit antennas. For simplicity, let us assume that each antenna sends a single frequency $f_i$ (However, in practice, CI beamforming may modulate a command atop the carrier frequency). The frequencies may be generated by different oscillators (PLLs), and thus the transmitted signals may have a random initial phase offset $\theta_i$. At the receiver, each signal may experience a phase rotation $\phi_i$ which depends on the channel from the transmit antenna. Hence, we can write the received signal at the receiver as:

$$y(t) = \sum_{i=1}^{N} e^{j(2\pi f_i t + \theta_i + \phi_i)} = \sum_{i=1}^{N} e^{j(2\pi f_i t + \beta_i)} \quad \text{(Equation 5)}$$

where $\theta_i$ is sampled uniformly at random, $\beta_i = \theta_i + \phi_i$ is sampled from a uniform distribution over [0, 2π], and π is Archimedes' constant.

To understand why CI beamforming's formulation allows us to overcome the threshold limit, let us compare its operation to that of a conventional beamformer under blind channel conditions.

In conventional traditional beamforming, the signals transmitted from different antennas all have the same frequency. Hence, the combined signal that arrives at the sensor will also have the same frequency, and the amplitude of that frequency will depend on the (unknown) channels. In such a scenario, the beamformer will encounter blind spots, i.e., locations inside the body where the signals will add up destructively and hence be unable to deliver power.

However, in CI beamforming, the signals transmitted from different antennas may all have different frequencies. Hence, the signal that arrives at the sensor may have a time-varying envelope. This time-varying envelope is desirable for at least two reasons:

First, it provides an opportunity to overcome the threshold voltage. In particular, since the different signals may have different frequencies, their phases may shift with respect to each other over time, providing opportunities for constructive (and destructive) interference at any given location. This may allow the sensor to harvest energy during periods where the voltage is larger than the threshold.

Second, if we consider another set of $\beta_i$s (i.e., another point inside the body or another combination of initial phase offsets), the sensor may also have opportunities for constructive interference, which may peak above the threshold voltage. This means that CI beamforming may charge sensors at different points inside the human body using the same set of frequency combinations, albeit each sensor experiences the peak voltage at a different point in time.

Note that the average received energy may be the same for both encoding schemes—that is, for both (i) frequency-based CI beamforming and (ii) conventional phase-based beamforming. However, an advantage of frequency-based encoding in CI beamforming is that it can achieve higher peaks, which enables the in-vivo sensor to overcome its threshold voltage. CI beamforming may "focus" its energy over a short period of time and may duty cycle the energy.

The maximum achievable peak voltage in CI beamforming is N (when the signals from all the antennas constructively interfere at some point in time). Hence, the maximum power gain is $N^2$. Note that even if we keep the same power budget (i.e., multiply the amplitude of the transmitted signal from each antenna by $1/\sqrt{N}$), CI beamforming may still provide a N×power gain. This gain may match that of traditional beamforming, but CI beamforming may achieve it even under blind channel conditions.

In illustrative implementations, CI beamforming delivers peak power to any point in 3D space, in such a way that each peak of power (in which threshold voltage is exceeded) lasts for only a short period of time. CI beamforming may deliver this peak power in blind channel conditions. Hence, CI beamforming is well-suited for powering up battery-free sensors when the channel is unknown.

One may ask whether an arbitrary frequency selection for CI beamforming would enable it to achieve the $N^2$ peak power gain. To understand the impact of CI beamforming's frequency selection, we ran Monte Carlo simulations, where we studied the behavior of two random sets consisting of 5 frequencies under random channel conditions. For each sampling point, we choose a random initial phase $\beta_i$ for each frequency in order to emulate the blind channel conditions. We then measured the peak power from the maximum value of y(t) over time.

Figure 6:
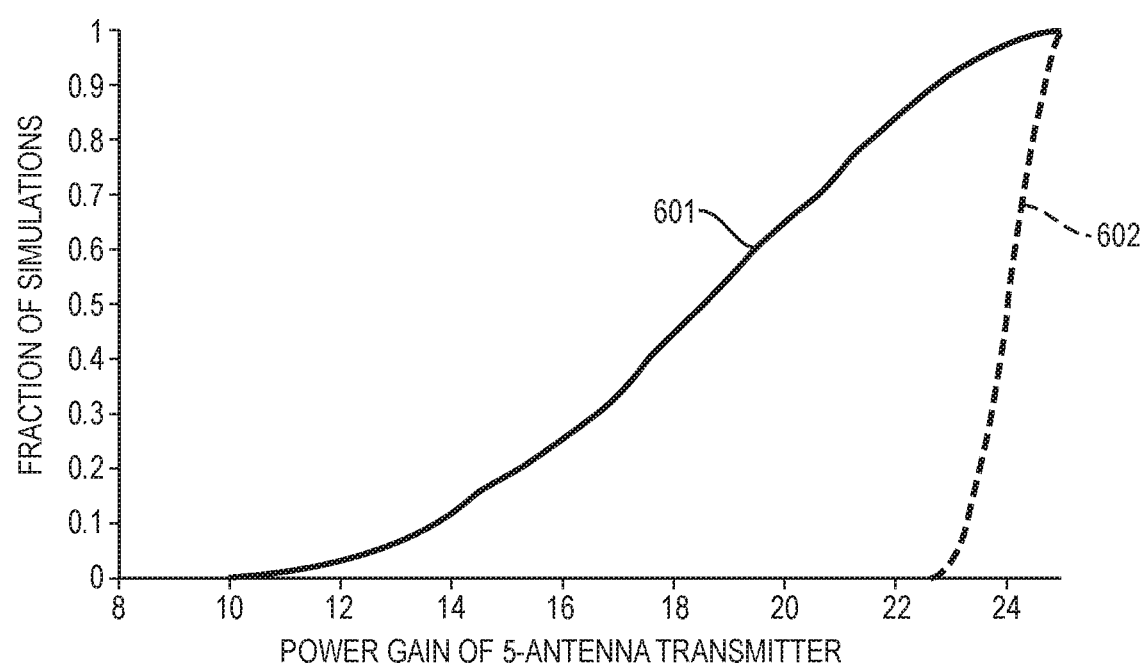
FIG. 6 is a chart that plots performance, across a set of channel conditions, of two different frequency combinations of a beamformer.

FIG. 6 plots the CDFs (cumulative distribution functions) of the peak power gains from the two different frequency sets, each transmitted from a 5-antenna transmitter. FIG. 6 shows that the two sets of frequencies exhibit drastically different performance. In particular, curve 602 corresponds to a set which can achieve 90% of the optimal performance across all possible channel conditions. On the other hand, curve 601 shows a frequency selection where across more than half the channel conditions, the power gain is smaller than 75% of the optimal performance. Hence, the performance of CI beamforming is highly dependent on the selected frequency combination.

In order to determine the optimal frequency combination that yields the highest peak power, we may formulate the task as an optimization problem:

$$\arg\max_{f_1, \ldots, f_N} E_\beta \left[ \max_t \left| \sum_{i=1}^{N} e^{j(2\pi f_i t + \beta_i)} \right| \right] \quad \text{(Equation 6)}$$

where $\beta = (\beta_1, \beta_2, \ldots, \beta_N)$ and E[·] indicates expectation.

Thus, we seek to find the frequency selection that maximizes the expected peak power over all possible channel conditions. We note that this optimization problem is not convex and hence it is not easily solvable.

Observe that the optimization problem in Equation 6 does not depend on the absolute frequency values $f_i$ but rather on the frequency offsets. This is because $$\left|\sum_{i=1}^{N} e^{(j(2\pi f_i t + \beta_i))}\right| = \left|\sum_{i=1}^{N} e^{(j(2\pi \Delta f_i t + \Delta \beta_i))}\right| \text{ where}$$

$\Delta f_i = f_i - f_1$ and $\Delta \beta_i = \beta_i - \beta_1$.

Hence, solving the optimization problem is equivalent to finding the optimal set of frequency differences $\Delta f_i$ for i= 1 ... N.

In some implementations, in addition to maximizing the peak power, frequency selection in CI beamforming satisfies the following two constraints:

(a) Cyclic operation: In health sensing applications, it is desirable to continuously monitor physiological conditions. Assume that we would like to obtain a sensor response every T seconds. Then, to ensure that CI beamforming delivers its peak power every T seconds, we satisfy two constraints: First, T is divisible by all $1/\Delta f_i$ for all i=2 ... N. Second, the maximization function is computed over 0<t<T. Without loss of generality, we can assume that T=1 s, and hence restrict ourselves to integer $\Delta f$'s.

(b) Query amplitude flatness: The second constraint arises from the operation of a backscatter sensor. Specifically, backscatter sensors decode the downlink query command by envelope detection. As a result, they tolerate only a small fluctuation in the amplitude of their received signal. CI beamforming, however, introduces amplitude variation by design. Hence, in order for the backscatter nodes to correctly decode, CI beamforming ensures that the received waveform satisfies the fluctuation constraint. Formally, if we define $A_{max}$ as the largest amplitude and $A_{min}$ as the minimum amplitude, CI beamforming may satisfy the following condition:

$(A_{max} - A_{min})/A_{max} \leq \alpha$     (Equation 7)

where $\alpha$ is defined as the percentage fluctuation.

In many cases, it is desirable that $\alpha<0.5$. This is because the sensor's energy detector uses half the amplitude difference as the decoding threshold to differentiate between bits 0 and 1.

Now let us consider the case of envelope degradation from the highest possible peak. Define $$Y(t) = \left|\sum_{i=1}^{N} e^{(j(2\pi \Delta f_i t + \Delta \beta_i))}\right|$$

as the envelope of beamforming signal and assume that at time to, the phases of all the carriers are perfectly aligned, giving the highest possible peak. That is $2\pi\Delta f_i t_0 + \Delta\beta_i \equiv 0$ (mod $2\pi$) for i=1 ... N, so that $Y(t_0)=N$. Let the $\Delta t$ denote the duration of the query command. Then, at $t_0+\Delta t$, if $\Delta t$ is relatively small, we may approximate Y(t) to the first order Taylor series expansion as:

$$\cos(x) \approx 1 - \frac{x^2}{2}$$

as:

$$Y(t_0 + \Delta t) \leq \sum_{i=1}^{N} \cos(2\pi\Delta f_i \Delta t) \leq N - 2\pi^2 \Delta t^2 \left(\sum_{i=1}^{N} \Delta f_i^2\right) \quad \text{(Equation 8)}$$

From Equation 7, we have $$\frac{Y(t_0) - Y(t_0 + \Delta t)}{Y(t_0)} \leq \alpha,$$

which leads to $$\frac{1}{N}\sum_{i=1}^{N} \Delta f_i^2 \leq \frac{\alpha}{2\pi^2 \Delta t^2} \quad \text{(Equation 9)}$$

Equation 9 shows that it is desirable to constrain the mean square of $\Delta f_i$, to allow more smooth transition at the peak power. For a typical RFID reader's query: (a) $\Delta t \approx 800$ µs; and (b) it is desirable for the root mean square of $\Delta f_i$ to be less than 199 Hz.

Putting the above constraints together, the problem in Equation 6 may be solved by the following two steps:

First, in CI beamforming, an optimal center frequency (or optimal carrier frequency) $f_1$ may be selected based on the system hardware constraints such as antenna impedance matching, power amplifier bandwidth, etc.

Second, in CI beamforming, the optimal frequencies $f_i = f_1 + \Delta f_i$ may be chosen by solving the following constrained heuristic optimization problem:

$$\max_{\Delta f_2, \ldots, \Delta f_N \in \mathbb{N}} E_\beta \left[\max_{0 \leq t \leq 1} \left|1 + \sum_{i=2}^{N} e^{j(2\pi \Delta f_i t + \beta_i)}\right|\right] \quad \text{(Equation 10)}$$

$$\text{s.t.} \quad \frac{1}{N}\sum_{i=2}^{N} \Delta f_i^2 \leq \frac{\alpha}{2\pi^2 \Delta t^2}$$

In CI beamforming, to solve the above optimization function, a one-time Monte Carlo simulation may be performed. In some cases, it is sufficient to solve this simulation only once, since it optimizes for all channel conditions. Once optimal frequency selection has been determined, a CI beamformer may modulate downlink commands atop the carrier frequencies and send them synchronously from multiple antennas.

In some cases: (a) a CB beamformer changes the carrier frequencies to avoid multipath fading; and (b) after each change (or after each of a subset of the changes) in carrier frequency, the optimization may be repeated.

In some cases, CI beamforming may facilitate communication with multiple in-vivo sensors. CI beamforming is well-suited to do so, since it may involve scanning 3D space through its time-varying channel.

In order to avoid collision between multiple sensors, CI beamforming may leverage a variety of techniques from standard backscatter communications. For example, CI beamforming may incorporate a select command into its query, specifying the identifier of the sensor it wishes to communicate with. If specifying this identifier results in elongating the query command, the elongation may be reflected in the $\Delta t$ constraint of Equation 10.

CI beamforming is inherently robust to phase changes caused by channel variations, including those caused by multipath, medium homogeneity, and mobility. However, the formulation of Equation 10 assumes that all the frequencies lie within the coherence bandwidth (i.e., it does not account for frequency-selective fading). In some scenarios, all the transmitted frequencies experience multipath fading, which may lower the total power delivered. To mitigate or avoid a reduction in power due to multipath fading of transmitted frequencies, the center frequency of each RF signal transmitted by the CI beamformer may be adaptively hopped to a different band to improve performance. In some cases, each hop changes frequency by a number of Hertz that exceeds the coherence bandwidth of the signal under then-existing environmental conditions.

In some cases, CI beamforming optimizes peak power rather than maximizing the conduction angle. An advantage of doing so is that peak power may be optimized even in blind channel conditions, whereas maximizing conduction angle may require a priori knowledge of the attenuation.

Alternatively, in some cases, CI beamforming is performed in two stages. design. The first stage may involve a discovery process where the CI beamformer optimizes for peak power. Then, once overall attenuation of the RF signal is determined, the CI beamformer may switch to a second stage where it maximizes the conduction angle.

Jamming-Free Communication

Unless a corrective step is taken, CI beamforming may cause from self-jamming. Specifically: (a) the transmitted signals may combine constructively at the receive antenna of the CI beamformer; and (b) thus the transmitted signals may saturate the receiver of the beamformer and prevent it from decoding the backscatter sensor's response.

To avoid this jamming problem, a CI beamformer may employ an out-of-band reader. The out-of-band reader may filter out the self-jamming from CI beamforming's transmit antennas. The out-of-band reader may exploit the fact that backscatter modulation is frequency-agnostic. Once a backscatter node (e.g., RFID tag) is powered up, an out-of-band reader may sense and decode its response at a different carrier frequency than was employed for powering up the backscatter node. The out-of-band reader for the CI beamformer may leverage this technique to reduce self-interference. For instance, the out-of-band reader may transmit and receive coherently at a carrier frequency that is different from the carrier frequencies employed by the beamformer's transmitters. This may enable the reader to filter out the jamming signal and decode the response out-of-band.

Hardware

Figure 7:
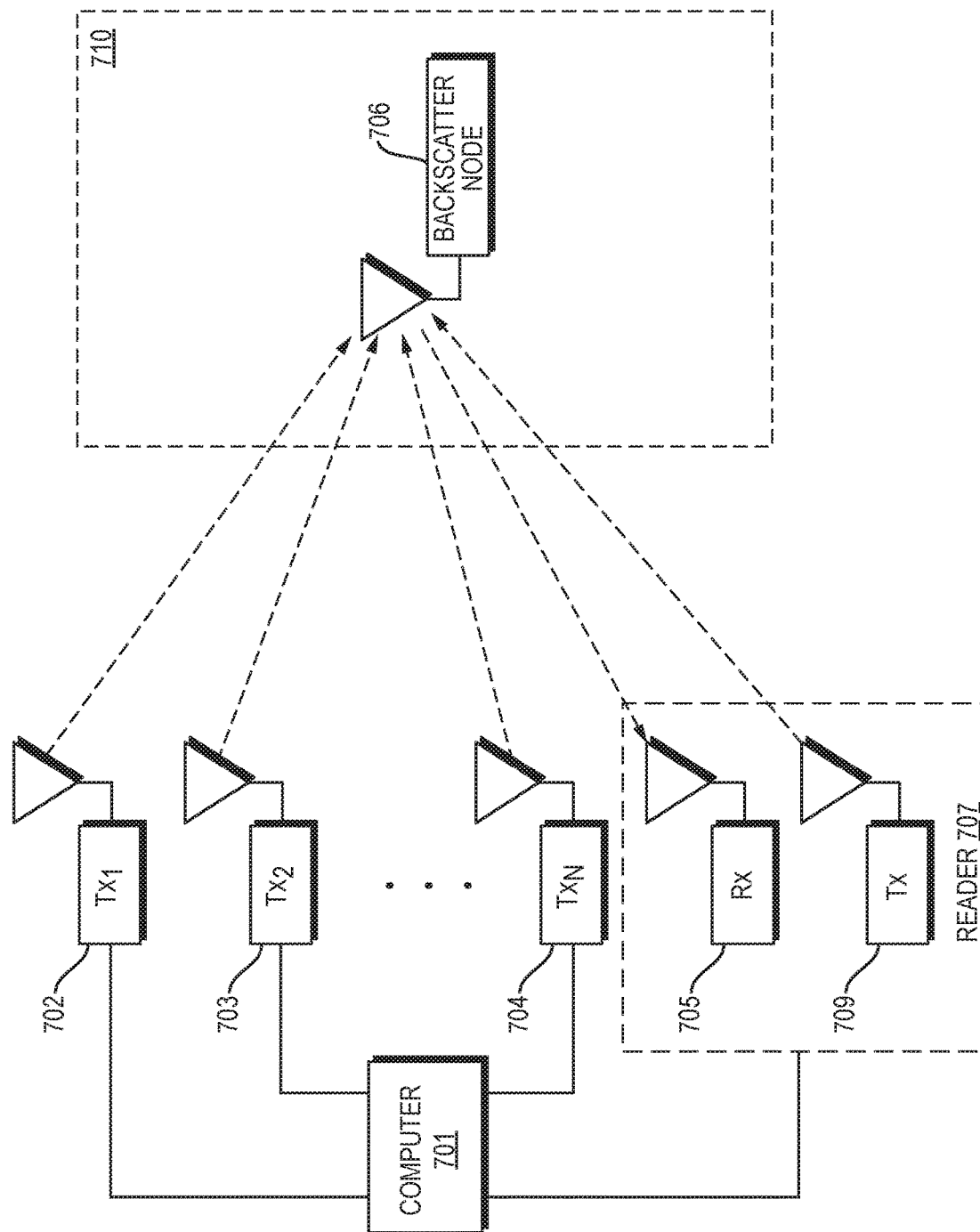
FIG. 7 shows hardware of a beamformer.

FIG. 7 shows hardware of a CI beamformer, in an illustrative implementation of this invention. In the example shown in FIG. 7, a CI beamformer includes N transmitters ($TX_1$ 702, $TX_2$ 703, ..., $TX_N$ 704), where N is a positive integer. These transmitters simultaneously transmit the same wireless command (e.g., by transmitting signals that have identical modulations of a carrier frequency). However, each of these transmitters transmits the command at a different frequency (e.g., at a different carrier frequency). The transmitted signals travel to an antenna of a backscatter node 706, and constructively and destructively interfere in such a way that the resulting waveform (formed by this constructive and destructive interference) causes, during a portion of the waveform, a voltage in the backscatter node to exceed the threshold voltage of the backscatter node. Thus, the resulting waveform delivers power to backscatter node 706, causing backscatter node 706 to power up and to modulate signals that backscatter from backscatter node 706. In some cases, backscatter node 706 comprises an RFID tag.

In FIG. 7, receiver $R_x$ 705 receives a wireless signal that has been modulated by, and backscattered from, backscatter node 706.

In some cases, an RFID reader 707 includes a receiver $R_x$ 705 and a transmitter $T_x$ 709. Reader 707 may transmit and receive wireless signals at a frequency that is out-of-band relative to the signals transmitted by the CB beamformer. Specifically, transmitter 709 of reader 707 may transmit an out-of-band RF signal at a frequency that is different than each of the carrier frequencies transmitted by the beamformer's transmit antennas. The out-of-band signal may be modulated by, and reflect from, backscatter node 706 and may then travel back to and be measured by receiver 705 of reader 707.

In FIG. 7, a computer 701 may control the transmission of wireless signals by transmit antennas of the CI beamformer, including controlling the different frequencies of these wireless signals. Also, computer 701 may analyze data indicative of a wireless signal received by one or more receiver antennas (e.g., 705). In some cases: (a) receiver 705 is a part of an out-of-band reader 707; and (b) computer 701 controls and receives data from out-of-band reader 707.

In FIG. 7: (a) transmitters 701, 702, 704, reader 707 and computer 701 may be located in air; and (b) backscatter node 706 may be located inside a media 710 that is denser than air. For instance, media 710 may comprise inhomogeneous bodily tissues, or may comprise a liquid such as water. The RF channel(s) through media 710 may be blind or unknown.

In some cases, transmitters 701, 702, 704, 709 transmit radio signals and receiver 705 receives radio signals. Alternatively, in some cases: (a) transmitters 701, 702, 704, 709 are each a speaker, loudspeaker or other transducer that generates sound, ultrasound or other pressure waves; and (b) receiver 705 is a microphone, hydrophone or other transducer that measures sound, ultrasound or other pressure waves. Alternatively, in yet other cases: (a) transmitters 701, 702, 704, 709 are each a source of electromagnetic radiation (e.g., one or more lasers or light-emitting diodes) that emit visible, infrared or ultraviolet light or other electromagnetic radiation; and (b) receiver 705 is a camera, interferometer, light sensor or other sensor that measures visible, infrared or ultraviolet light or other electromagnetic radiation.

Prototype

The following six paragraphs describe a prototype of this invention.

In this prototype, a multi-antenna beamformer includes USRP® N210 software radios with SBX daughterboards. The output of each USRP® is fed into a HMC453QS16 power amplifier, whose 1-dB compression point is 30 dBm. Each amplifier is then connected to MT-242025 antenna, which is a 7 dBi RHCP (right hand circular polarized) RFID (radio frequency identification) antenna. The USRP®s are all connected to a CDA-2900 Octoclock with a 10 MHz reference clock and a PPS synchronization pulse signal. At the backend, all the USRP®s are connected via Ethernet cables to a 64-bit machine running Ubuntu 16.04.

In this prototype, the beamforming algorithm and concurrent data communication are programmed in the USRP®'s UHD driver in C++. The communication follows standard RFID protocol. Each USRP® is programmed to transmit at a different frequency. The center carrier is chosen at 915 MHz and the relative frequency differences $\Delta f_i$ (i= 1 ... 10) are 0, 7, 20, 49, 68, 73, 90, 113, 121 and 137 Hz, respectively. The USRP®s synchronously transmit their commands at their respective frequencies. Frequency selection is performed to optimize peak power. The small frequency offsets are soft-coded into complex numbers before sending them to the USRP.

In this prototype, an out-of-band reader is employed. The out-of-band reader mitigates self-interference (also known as self-jamming) that would otherwise occur if the CI beamformer were to employ an in-band reader (e.g., a reader that reads backscattered modulated signals at the same frequency as that of one of the RF signals transmitted by a transmit antenna of the CI beamformer).

In this prototype, the out-of-band reader is implemented on two USRP® N210 software radios with SBX daughterboards, connected to MT-242025 antennas. One USRP® transmits and the other USRP® receives. To avoid jamming from the CI beamformer, the out-of-band reader operates at a different center frequency (880 MHz) than that of the CI beamformer. The received signal is filtered using a high-rejection SAW (surface acoustic wave) filter to mitigate jamming from the beamformer.

In this prototype, the out-of-band reader is time-synchronized with the CI beamformer and synchronously transmits its same commands. This ensures that the commands do not collide at the sensor, and that the reader's signal does not compromise the modulation depth. The receiver measures the backscatter sensor's response as it replies to the beamformer's command. To compensate for the large attenuation in tissues, the reader averages responses over 1-second intervals. This constitutes the period of CI beamforming's envelope, and allows the system to coherently combine the backscatter responses to boost the SNR. The reader then uses an RFID decoder in MATLAB® and operates on the averaged signal.

In some use scenarios of this prototype, the CI beamformer transmits to two types of commercial battery-free backscatter nodes. The first is a standard RFID tag, the Avery Dennison® AD-238u8. The tag measures 1.4 cm×7 cm. The second is a miniature RFID tag, the Xerafy™ Dash-On XS RFID tag. The miniature tag measures 1.2 cm×0.3 cm×0.22 cm.

The prototype described in the preceding six paragraphs is a non-limiting example of this invention. This invention may be implemented in other ways.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a beamformer or a reader, (2) to optimize a set of multiple frequencies that are transmitted by the beamformer, in such a way that the optimization maximizes peak power; (3) to perform adaptive frequency hopping to mitigate or avoid multi-path fading; (4) to cause a beamformer to maximize peak power while a backscatter node powers up, (5) after the RF channel with a backscatter node is measured, to cause the beamformer to maximize conduction angle; (6) to receive data from, control, or interface with one or more sensors; (7) to perform any other calculation, computation, program, algorithm, or computer function described or implied herein; (8) to receive signals indicative of human input; (9) to output signals for controlling transducers for outputting information in human perceivable format; (10) to process data, to perform computations, and to execute any algorithm or software; and (11) to control the read or write of data to and from memory devices (tasks 1-11 of this sentence referred to herein as the "Computer Tasks"). The one or more computers (e.g. 701) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 701, 707) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 701) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

"Archimedes' constant" means the ratio of a circle's circumference to its diameter. Archimedes' constant is sometimes called "pi" or "π". Archimedes' constant is an irrational number that is approximately equal to 3.14159.

To compute "based on" specified data means to perform a computation that takes the specified data as an input.

As used herein, a "beamformer" means a set of multiple transmitters that are configured to transmit wireless signals during a period of time in such a way that the wireless signals constructively interfere, during at least a portion of the period of time, at a spatial point external to the multiple transmitters.

"Carrier frequency" means frequency of a carrier wave, before taking into account modulation, if any, of the carrier wave.

A non-limiting example of a "carrier wave" is a signal that is modulated by another signal. Another non-limiting example of a "carrier wave" is an unmodulated signal (i.e., a signal that is not modulated by another signal).

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

An equation above may be referred to herein by the equation number set forth to the right of the equation. For instance, "Equation 10" means the entire mathematical optimization problem above that has the phrase "(Equation 10)" written to the right of it. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, "period" means an interval of time. As used herein, unless the context clearly indicates otherwise, the term "period" does not create any implication, either way, regarding periodicity—that is, does not create any implication regarding whether or not the time interval is a cycle in a repeating pattern. A non-limiting example of a "period" is a time interval in a non-periodic pattern. Another non-limiting example of a "period" is a time interval that consists of one cycle in a repeating pattern. Another non-limiting example of a "period" is a time interval that consists of a portion of a repeating pattern, which portion is not one cycle of the pattern.

"PLL" means phased-locked loop.

As used herein, the term "set" does not include a group with no elements.

To say that X transmits and "simultaneously" Y transmits means that X is transmitting throughout a period of time and that Y is also transmitting throughout the same period of time.

"Radio frequency" or "RF" means a frequency that is greater than or equal to 3 hertz and less than or equal to 3 terahertz.

"RFID" means radio frequency identification.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

Non-limiting examples of a "transmitter" are: (a) a radio transmitter; (b) a light source that transmits a signal by emitting visible light, infrared light or ultraviolet light, and (c) a transducer (e.g., a speaker or loudspeaker) that generates sound or other pressure waves.

Non-limiting examples of "wireless signals" are: (a) electromagnetic radiation (e.g., radio or light waves propagating through air or a vacuum); and (b) sound, ultrasound or pressure waves.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a system comprising a beamformer, wherein: (a) the beamformer includes a first set of antennas; and (b) the beamformer is configured to transmit a first set of wireless signals from the first set of antennas during a period of time, in such a way that (i) each antenna in the first set of antennas transmits a specific signal in the first set of signals, which specific signal is different than that transmitted by any other antenna in the first set of antennas, at least because the specific signal has a carrier frequency that is different than that of each other signal in the first set of signals; (ii) the first set of signals has a distribution of carrier frequencies; and (iii) the distribution of carrier frequencies maximizes peak power received at a spatial position external to the beamformer, which peak power occurs during a subperiod of the period of time, which subperiod occurs while constructive interference of the signals at the spatial position is at a global maximum for the period of time. In some cases, the system also includes a backscatter node that is located at the spatial position. In some cases: (a) the system also includes a backscatter node that is located at the spatial position; (b) the peak power exceeds a threshold power; and (c) the backscatter node is configured to harvest power only when received power at the backscatter node is greater than the threshold power. In some cases, the system also includes a radio frequency identification tag that is located at the spatial position. In some cases: (a) the system also includes a backscatter node that is located at the spatial position; and (b) the system is configured to transmit a wireless signal that encodes a command (command signal) in such a way that received power of the command signal at the backscatter node is within a range of amplitudes, which range of amplitudes consists of amplitudes at which the backscatter node is configured to decode the command signal. In some cases, the system is configured to transmit a wireless command in such a way that received power at the spatial position exceeds a specified threshold at all times throughout the command. In some cases, the system also comprises a transceiver, which transceiver is configured to transmit and receive signals at a carrier frequency that is different than that of each signal in the first set of signals. In some cases: (a) the system also comprises a transceiver, which transceiver is configured to transmit an additional signal at a carrier frequency that is different than that of each signal in the first set of signals; (b) the first set of antennas modulate the first set of signals by a first modulation and simultaneously the transceiver modulates the additional signal by a second modulation; and (c) the first modulation and the second modulation are identical to each other throughout the period of time. In some cases, the first and second modulations each comprise pulse-width modulation. In some cases: (a) the system also comprises a transceiver, which transceiver is configured to transmit an additional signal at a carrier frequency that is different than that of each signal in the first set of signals; (b) the first set of antennas modulate the first set of signals by a first modulation and simultaneously the transceiver modulates the additional signal by a second modulation; and (c) the first modulation and the second modulation are different from each other. In some cases, the second modulation comprises a constant modulation. In some cases: (a) the system also comprises a transceiver, which transceiver is configured to transmit an additional signal at a carrier frequency that is different than that of each signal in the first set of signals; and (b) the first set of antennas modulate carrier frequencies of the first set of signals while the additional signal is not modulated. In some cases: (a) the system also includes one or more computers; (b) the one or more computers are programmed (i) to calculate an estimate of phase of a signal that reflects from the spatial position and that is received by a particular antenna of the system, and (ii) based on the estimate of phase, to cause a second set of antennas of the system to transmit a second set of wireless signals during a second period of time, in such a way that (A) each antenna in the second set of antennas transmits a specific signal in the second set of signals, which specific signal is different than that transmitted by any other antenna in the second set of antennas, at least because the specific signal has a phase that is different than that of each other signal in the second set of signals, and (B) constructive interference of the second set of signals causes received power at the spatial position to exceed a threshold during a portion of the second period of time; (c) the first and second set of antennas may, but do not necessarily, overlap entirely or partially; and (d) the particular antenna may be, but is not necessarily, a member of the first or second sets of antennas. In some cases, the receiver is an artificial sensor located inside a living organism. In some cases: (a) the system also includes (i) one or more computers and (ii) at least one antenna that is configured to receive signals (received signals), which received signals are reflections from a group of radio frequency identification (RFID) tags; and (b) the one or more computers are programmed to analyze the received signals to determine spatial coordinates and identity of the RFID tags. In some cases: (a) the system also includes one or more computers; and (b) the one or more computers are programmed to perform an algorithm that causes the beamformer to transmit the first set of wireless signals, which algorithm does not take, as an input, data that specifies or is computationally derived from phase or amplitude of any wireless signal that has reflected from the spatial position. Each of the cases described above in this paragraph is an example of the system described in the first sentence of this paragraph, and is also an example of an embodiment of this invention that may be combined with other embodiments of this invention.

In some implementations, this invention is a system comprising multiple transmitters, wherein: (a) the multiple transmitters include a first set of antennas; and (b) the multiple transmitters are configured to transmit a first set of wireless signals from the first set of antennas during a period of time, in such a way that (i) each antenna in the first set of antennas transmits a specific signal in the first set of signals, which specific signal is different than that transmitted by any other antenna in the first set of antennas, at least because the specific signal has a carrier frequency that is different than that of each other signal in the first set of signals; (ii) the first set of signals has a distribution of carrier frequencies; and (iii) the distribution of carrier frequencies maximizes peak power received at a receiver, which peak power occurs during a subperiod of the period of time, which subperiod occurs when constructive interference of the signals at the receiver is at a global maximum for the period of time. In some cases, the receiver is a backscatter node. Each of the cases described above in this paragraph is an example of the system described in the first sentence of this paragraph, and is also an example of an embodiment of this invention that may be combined with other embodiments of this invention.

In some implementations, this invention is a system comprising a transceiver and an additional transmitter; wherein: (a) the additional transmitter is configured to transmit a first signal at a first power and at a first carrier frequency, in such a way that the first signal powers up a backscatter node and includes commands for the backscatter node; (b) the transceiver is configured (i) to transmit a second signal at a second power and at a second carrier frequency, and (ii) to decode a reflection of the second signal that reflects back to the transceiver from the backscatter node; (c) the first power is greater than the second power; and (d) the first carrier frequency is different than the second carrier frequency. In some cases, the backscatter node is a radio frequency identification tag. Each of the cases described above in this paragraph is an example of the system described in the first sentence of this paragraph, and is also an example of an embodiment of this invention that may be combined with other embodiments of this invention.

In some implementations, this invention is a system comprising a beamformer, wherein: (a) the beamformer includes a first set of transmitters; and (b) the beamformer is configured to transmit a first set of wireless signals from the first set of transmitters during a period of time, in such a way that (i) each transmitter in the first set of transmitters transmits a specific signal in the first set of signals, which specific signal is different than that transmitted by any other transmitter in the first set of transmitters, at least because the specific signal has a carrier frequency that is different than that of each other signal in the first set of signals; (ii) the first set of signals has a distribution of carrier frequencies; and (iii) the distribution of carrier frequencies maximizes peak power received at a spatial position external to the beamformer, which peak power occurs during a subperiod of the period of time, which subperiod occurs while constructive interference of the signals at the spatial position is at a global maximum for the period of time. In some cases, the wireless signals comprise electromagnetic radiation. In some cases, the wireless signals comprise pressure waves. In some cases, the wireless signals comprise visible light or infrared light. In some cases, the wireless signals comprise pressure waves. In some cases, the wireless signals comprise sound waves in the 20 Hertz to 20 kiloHertz frequency band. In some cases, the wireless signals comprise longitudinal pressure waves in the 20 kiloHertz to 200 megaHertz frequency hand. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising transmitting a first set of wireless signals from a first set of antennas of a beamformer during a period of time, in such a way that:

(a) each antenna in the first set of antennas transmits a specific signal in the first set of signals, which specific signal is different than that transmitted by any other antenna in the first set of antennas, at least because the specific signal has a carrier frequency that is different than that of each other signal in the first set of signals;
(b) the first set of signals has a distribution of carrier frequencies; and
(c) the distribution of carrier frequencies maximizes peak power received at a spatial position external to the beamformer, which peak power occurs during a subperiod of the period of time, which subperiod occurs while constructive interference of the signals at the spatial position is at a global maximum for the period of time.

2. The method of claim 1, wherein a backscatter node is located at the spatial position.

3. The method of claim 1, wherein:
(a) a backscatter node is located at the spatial position;
(b) the peak power exceeds a threshold power; and
(c) the backscatter node harvests power only when received power at the backscatter node is greater than the threshold power.

4. The method of claim 1, wherein a radio frequency identification tag is located at the spatial position.

5. The method of claim 1, wherein:
(a) a backscatter node is located at the spatial position; and
(b) the method further comprises transmitting a wireless signal that encodes a command (command signal) in such a way that received power of the command signal at the backscatter node is within a range of amplitudes, which range of amplitudes consists of amplitudes at which the backscatter node is configured to decode the command signal.

6. The method of claim 1, wherein the method further comprises transmitting a wireless command in such a way that received power at the spatial position exceeds a specified threshold at all times throughout the command.

7. The method of claim 1, wherein the method further comprises transmitting and receiving signals at a carrier frequency that is different than that of each signal in the first set of signals.

8. The method of claim 1, wherein:
(a) the method also comprises
  (i) transmitting, with a transceiver, an additional signal at a carrier frequency that is different than that of each signal in the first set of signals, and
  (ii) modulating, with the first set of antennas, the first set of signals by a first modulation and simultaneously modulating, with the transceiver, the additional signal by a second modulation; and
(b) the first modulation and the second modulation are identical to each other throughout the period of time.

9. The method of claim 8, wherein the first and second modulations each comprise pulse-width modulation.

10. The method of claim 1, wherein:
(a) the method also comprises
  (i) transmitting, with a transceiver, an additional signal at a carrier frequency that is different than that of each signal in the first set of signals, and
  (ii) modulating, with the first set of antennas, the first set of signals by a first modulation and simultaneously modulating, with the transceiver, the additional signal by a second modulation; and
(b) the first modulation and the second modulation are different from each other.

11. The method of claim 10, wherein the second modulation comprises a constant modulation.

12. The method of claim 1, wherein the method also comprises:
(a) transmitting, with a transceiver, an additional signal at a carrier frequency that is different than that of each signal in the first set of signals; and
(b) modulating, with the first set of antennas, carrier frequencies of the first set of signals while the additional signal is not modulated.

13. The method of claim 1, wherein:
(a) the method also comprises
  (i) calculating an estimate of phase of a signal that reflects from the spatial position and that is received by a particular antenna, and
  (ii) transmitting, with a second set of antennas, a second set of wireless signals during a second period of time, in such a way that
    (A) each antenna in the second set of antennas transmits a specific signal in the second set of signals, which specific signal is different than that transmitted by any other antenna in the second set of antennas, at least because the specific signal has a phase that is different than that of each other signal in the second set of signals, and
    (B) constructive interference of the second set of signals causes received power at the spatial position to exceed a threshold during a portion of the second period of time;
(b) the first and second set of antennas may, but do not necessarily, overlap entirely or partially; and
(c) the particular antenna may be, but is not necessarily, a member of the first or second sets of antennas.

14. The method of claim 1, wherein the spatial position is at a receiver antenna of an artificial sensor located inside a living organism.

15. The method of claim 1, wherein the method also includes:
(a) receiving signals (received signals) that are reflections from a group of radio frequency identification (RFID) tags; and
(b) analyzing the received signals to determine spatial coordinates and identity of the RFID tags.

16. The method of claim 1, wherein the method also comprises performing an algorithm that causes the beamformer to transmit the first set of wireless signals, which algorithm does not take, as an input, data that specifies or is computationally derived from phase or amplitude of any wireless signal that has reflected from the spatial position.

17. A method comprising transmitting, with a first set of antennas, a first set of wireless signals during a period of time, in such a way that
(a) each antenna in the first set of antennas transmits a specific signal in the first set of signals, which specific signal is different than that transmitted by any other antenna in the first set of antennas, at least because the specific signal has a carrier frequency that is different than that of each other signal in the first set of signals;
(b) the first set of signals has a distribution of carrier frequencies; and
(c) the distribution of carrier frequencies maximizes peak power received at a receiver, which peak power occurs during a subperiod of the period of time, which subperiod occurs when constructive interference of the signals at the receiver is at a global maximum for the period of time.

18. A method comprising transmitting, with a first set of transmitters of a beamformer, a first set of wireless signals during a period of time, in such a way that
- (a) each transmitter in a first set of transmitters transmits a specific signal in the first set of signals, which specific signal is different than that transmitted by any other transmitter in the first set of transmitters, at least because the specific signal has a carrier frequency that is different than that of each other signal in the first set of signals;
- (b) the first set of signals has a distribution of carrier frequencies; and
- (c) the distribution of carrier frequencies maximizes peak power received at a spatial position external to the beamformer, which peak power occurs during a subperiod of the period of time, which subperiod occurs while constructive interference of the signals at the spatial position is at a global maximum for the period of time.

19. The method of claim 18, wherein the wireless signals comprise electromagnetic radiation.

20. The method of claim 18, wherein the wireless signals comprise visible light or infrared light.

21. The method of claim 18, wherein the wireless signals comprise pressure waves.

22. The method of claim 18, wherein the wireless signals comprise sound waves in the 20 Hertz to 20,000 Hertz frequency band.

23. The method of claim 18, wherein the wireless signals comprise longitudinal pressure waves in the 20,000 Hertz to 200 megaHertz frequency hand.

* * * * *